United States Patent
Chandra et al.

(10) Patent No.: US 9,639,627 B2
(45) Date of Patent: May 2, 2017

(54) METHOD TO SEARCH A TASK-BASED WEB INTERACTION

(75) Inventors: Praphul Chandra, Karnataka (IN); Geetha Manjunath, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1309 days.

(21) Appl. No.: 12/878,042

(22) Filed: Sep. 9, 2010

(65) Prior Publication Data
US 2012/0023089 A1    Jan. 26, 2012

(30) Foreign Application Priority Data
Jul. 26, 2010    (IN) .......................... 2124/CHE/2010

(51) Int. Cl.
*G06F 17/30*    (2006.01)
(52) U.S. Cl.
CPC .............................. *G06F 17/30899* (2013.01)
(58) Field of Classification Search
USPC ........................................ 707/707, 769, 709
See application file for complete search history.

(56) References Cited

U.S. PATENT DOCUMENTS

| | | | |
|---|---|---|---|
| 3,871,081 A | 3/1975 | Inoue et al. | |
| 3,996,888 A | 12/1976 | Lofdahl et al. | |
| 4,040,383 A | 8/1977 | Vandervort | |
| 4,974,027 A | 11/1990 | Landa et al. | |
| 5,745,829 A | 4/1998 | Gazit et al. | |
| 6,108,513 A | 8/2000 | Landa et al. | |
| 6,321,222 B1 * | 11/2001 | Soderstrom et al. | |
| 7,584,181 B2 | 9/2009 | Zeng et al. | |
| 7,698,344 B2 * | 4/2010 | Sareen et al. | 707/767 |
| 2007/0244879 A1 * | 10/2007 | Clausner | 707/5 |
| 2009/0100015 A1 * | 4/2009 | Golan | 707/3 |
| 2009/0157617 A1 * | 6/2009 | Herlocker et al. | 707/3 |
| 2009/0157653 A1 * | 6/2009 | Herlocker et al. | 707/5 |
| 2009/0204599 A1 | 8/2009 | Morris et al. | |
| 2009/0282021 A1 | 11/2009 | Bennett | |
| 2011/0035402 A1 * | 2/2011 | Agrawal et al. | 707/769 |
| 2011/0072033 A1 * | 3/2011 | White et al. | 707/768 |
| 2011/0208730 A1 * | 8/2011 | Jiang et al. | 707/727 |

FOREIGN PATENT DOCUMENTS

WO    WO-2010039134    4/2010

OTHER PUBLICATIONS

Jae-Wook Ahn; Peter Brusilovsky; Daqing He; Jonathan Grady; Qi Li, Personalized Web Exploration with Task Models, http://portal.acm.org/citation.cfm?id= 1367497.1367499& coll=Portal &dl=ACM &CFID=86647311& CFTOKEN=36203308, 2008; 1-10.

* cited by examiner

*Primary Examiner* — Joshua Bullock
(74) *Attorney, Agent, or Firm* — HP Inc. Patent Department

(57) ABSTRACT

Presented is a method, system and computer readable product to search a task-based web interaction. A task-based web interaction search query is provided to a search engine. The search results are classified into a set of information parameters. The information parameters are compared against a repository containing multiple sets of information parameters. Upon identification of a corresponding set of information parameters, a task-based web interaction associated with the identified set of information parameters is presented.

13 Claims, 2 Drawing Sheets

METHOD TO SEARCH A TASK-BASED WEB INTERACTION

BACKGROUND

The World Wide Web (WWW) has revolutionized the way people search for information. With increased affordability of computer and mobile devices, and improved network connectivity, the Internet has emerged as the preferred medium for people to find relevant and useful information. The emergence of a search engine has made this task a lot easier. A typical web search engine allows a user to provide one or more search terms through a browser based interface. It then searches the Web to retrieve a list of items related to the specified search terms. The retrieved items could be documents, images, videos, web links, etc.

Recognizing the continuous need of a user (and potentially billions of users), a number of companies have started offering web based search over the Internet. Google, Yahoo and Bing (from Microsoft) are some of the popular search engines that are around today. Increased competition amongst search service providers have resulted in various improvements over the algorithms behind the search engine technology. However, most of the search engines still concentrate on returning documents or web pages which are most relevant to the search key words. There are situations or user needs where these results may not be very helpful to an end user.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

Figure 1:
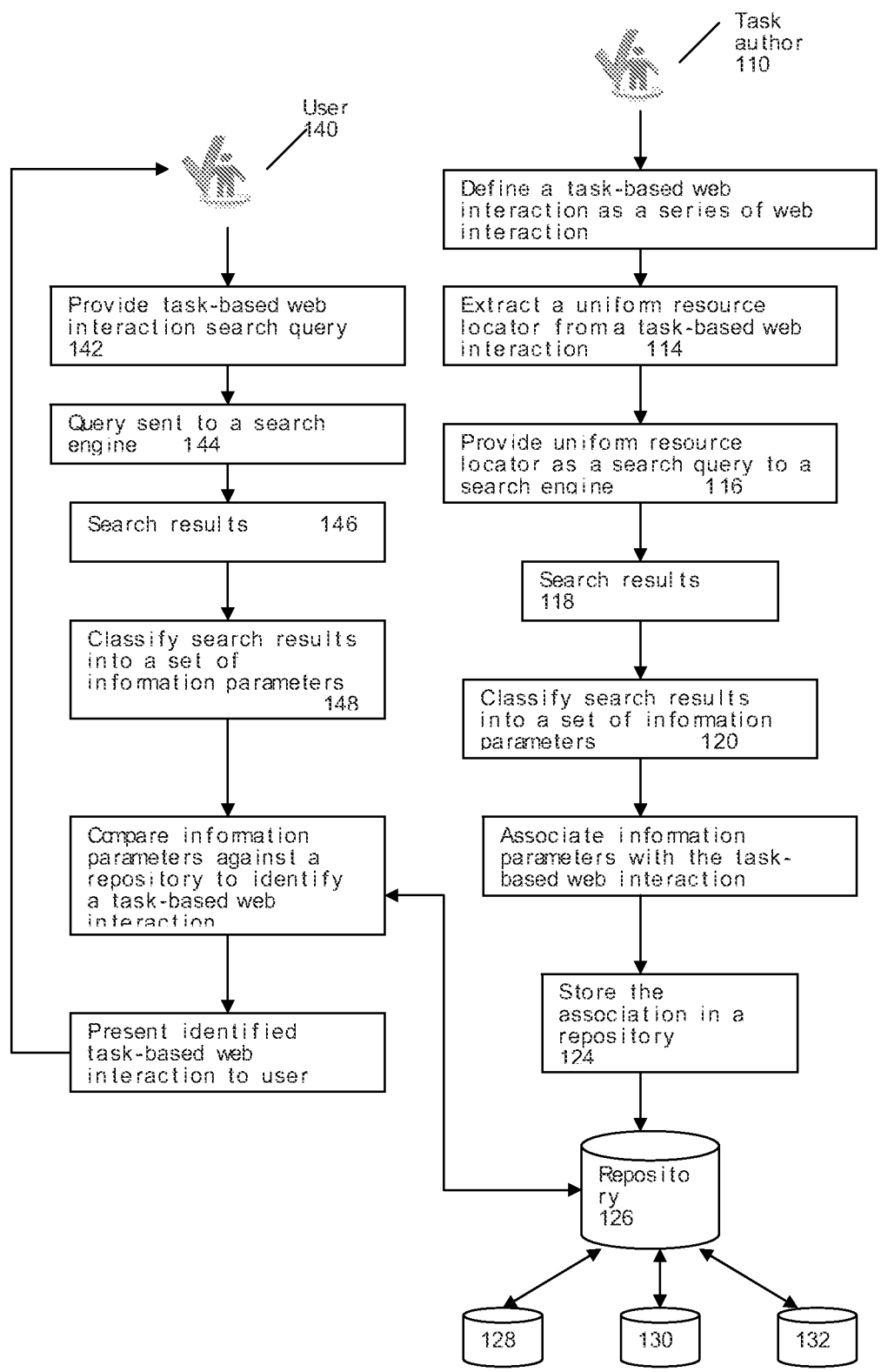
FIG. 1 shows a flow chart of a computer-implemented method of searching a task-based web interaction according to an embodiment.

Search engines have come a long way over the last decade or so in terms of both technological developments and the business models they are based upon. From simply providing directory listings of files located on FTP (File Transfer Protocol) sites, to present day crawling, indexing, and searching methodology typically used these days, the search engines have shown significant improvements in the type of results that may be offered to a user. A user has access to thousands of information items, from simple text documents to high definition videos, by simply providing a few search terms to a search engine.

While a search engine may be able to provide millions of web items, in a matter of few seconds, it is the relevance and usefulness of the search results that is valued by a user. As mentioned earlier, most search engines still concentrate on returning static documents or web pages based on search terms. There are situations or user needs where these results may not be very helpful to an end user. One such user need is to accomplish a task over the Web. For example, a user may wish to buy a movie ticket over the internet. In the present scenario, a simple search query comprising search words, for example, "buy", "movie" and "ticket", over the Web, would probably result in search results comprising web sites offering online movie ticket booking, movie ticket prices, multiplex offerings and movie timings, etc. To book a movie ticket, based on such types of search results, a user would first need to select a movie ticket booking web site, select a movie, select a show time of the movie, provide number of tickets required, delivery address of the user, payment details, and so on so forth. Basically, a user would need to go through a number of steps to complete his/her transaction. Also, the process would need to be repeated again in the future for another movie. Furthermore, a user has no mechanism to share the entire task-based interaction (series of steps involved) with another user in a simple and convenient manner.

A widget provides a mechanism to a user to accomplish a function by packaging the steps required to complete the function into a single unit or entity. By simply invoking a single entity (widget), a user is able to accomplish the function detailed therein. A widget providing weather information is one example. Another could be a stock widget, which may enable a user to obtain the current price of a predefined stock and execute a trade based on a predefined price set by a user.

A tasklet represents a mechanism for creating a task-based user interaction pattern. It is used to capture and represent a user's preferred way of accomplishing a task. Instead of executing a series of steps to accomplish a task, the tasklets enables a user to capture the user's flow over a set of web pages as an entity. For example, in the online movie ticket booking scenario mentioned above, a tasklet may be created that automates the task of accessing a user's movie booking site, and given the choice of a movie, automates the selection of a predefined show time, delivery address of the user and payment details. A tasklet can be reused in future and shared as well.

Broadly speaking, a task-based web interaction characterizes a plurality of actions that are performed over the web to accomplish a task. Both widgets and tasklets represent task-based web interaction. Tasklets have been described in detail, in the applicant's patent application no. PCT/IN2009/000327, which is incorporated by reference herein.

Embodiments of the present solution provide a method, system and computer executable code for searching a task-based web interaction.

FIG. 1 shows a flow chart of a computer-implemented method of searching a task-based web interaction according to an embodiment.

The method operates at two levels. The first level involves building a searchable repository of task-based interactions and the second level entails searching the repository for task-based interactions.

Building a Searchable Repository of Task-Based Interactions

As mentioned above, a task-based interaction, tasklet, packages the sequence of web interactions needed to perform a task on multiple webpages with individual URLs. In step 112, an author 110 defines a task-based web interaction as a series of web interactions. As mentioned above, a task-based web interaction characterizes a plurality of actions that are performed over the web to accomplish a task. Both widgets and tasklets represent task-based web interaction. Tasklets have been described in detail, in the applicant's patent application no. PCT/IN2009/000327.

In step 114, the author 110 extracts at least one uniform resource locator (URL) from a task-based web interaction. A task-based web interaction typically involves multiple steps, with each step involving at least one uniform resource locator (URL). An author may extract the uniform resource locators of all the steps involved. To illustrate, in context of the online movie ticket booking scenario mentioned earlier, an author may extract uniform resource locator(s) for each of the various steps involved, such as, the URL for the movie booking site, the URL for selecting a movie, the URL for selecting a show time, the URL for providing delivery address of a user, the URL for payment details, etc. Basically, the author obtains the uniform resource locators for the complete task flow on the web.

In step 116, the author 110 provides at least one uniform resource locator as a search query to a search engine. Since a web-interaction typically involves accessing more that one uniform resource locator over the web, an author usually end up extracting multiple uniform resource locators from the process. In this step, the author selects a uniform resource locator (from one of the URLs extracted earlier) and provides it as a search query to a search engine. The author may repeat this step for all extracted uniform resource locators separately or all the URLs may be searched together as a unit. To illustrate it in the context of the online movie ticket booking scenario, an author may provide the URL for the movie booking site to a search engine in the first instance, the URL for selecting a movie in the second instance, and the rest of the uniform resource locators in subsequent separate instances. The author may also search all the extracted URLs as a unit.

In step 118, the search results for a uniform resource locator(s) provided in step 116 is/are obtained from the search engine.

In step 120, the search results obtained in step 118 are classified into a set of information parameters. In a typical scenario, a search engine usually provides a variety of search results. For example, the search engine may return a set of URLs, associated quicklinks (list of some of the most frequently requested pages) and a set of keywords related to a submitted URL(s). The different categories of results (set of URLs, quicklinks, and key words) may be referred as information parameters. To illustrate, in context of the online movie ticket booking scenario, the search results for a URL on a movie booking site may yield different information parameters, such as, multiple URLs of various movie booking sites (www.pvrmovies.com, www.adlabs.com, www.spicecinema.com); quicklinks (www.bookyourtickets.com, www.foxmovies.com) and a number of keywords, such as, "purchase movie ticket", "new movie ticket", "free movie tickets", etc.

In step 122, the resulting set of information parameters are associated as meta data of the task-based web interaction of step 114. For example, if a search results provides information parameters, such as a set of URLs and a set of key words, all of these would get mapped to the task-based web interaction that provided at least one uniform resource locator (URL). In the movie ticket booking scenario, the search results for a URL on a movie booking site, such as, multiple URLs of various movie booking sites (www.pvrmovies.com, www.adlabs.com, www.spicecinema.com) and keywords, "purchase movie ticket", "new movie ticket", "free movie tickets", would get mapped to the task-based web interaction, which was that a user wanted to buy a movie ticket over the internet.

Also, the association between a set of parameters and a task-based web interaction may be unstructured (e.g. URLs and keywords serving as tags for the task-based web interaction) or it may be structured (e.g. a graphical or ontological representation of a task-based web interaction containing URLs it operates on, the name of the form fields that are required to be filled in etc.)

In step 124, the association or mapping between the set of information parameters and the task-based web interaction is stored in a repository (database) 126. Therefore, the repository 126 would contain multiple sets of information parameters, wherein each set corresponds to a task-based web interaction. The repository 126 may be a local personal repository (for example, on a users' computer system) 128, a social network repository 130, or a global repository 132.

A graphical user interface (GUI) may be used to upload task-based web interactions and the associated sets of information parameters into the repository 126.

Searching a Repository for Task-Based Interactions

In step 142, a user 140 provides a task-based web interaction search query to a computing device. The computing device may be, but not limited to, a desktop computer, a laptop computer, a computer server or a mobile device.

Further, a task-based web interaction search query may very well be a simple web search query. The proposed method does not require a user to explicitly specify that he or she is searching for a task-based web interaction. Although an option may be provided through a suitable user interface, to specify that a user is explicitly searching for a task-based web interaction(s). In the context of online movie ticket booking scenario, a user may wish to buy a movie ticket over the internet. In this case, the user may provide a task-based search query (akin to a web based search query) comprising search words, "buy", "movie" and "ticket", and the like, to a search engine.

In step 144, the input query is sent to a search engine. The search engine may be a publicly available search engine or a private search engine.

In step 146, the search results for the task-based search query provided in step 142 are obtained from the search engine.

In step 148, the search results are classified into a set of information parameters. Each set of information parameters relates to the task-based web interaction provided in the search query. For example, in the movie ticket booking scenario, if the search results for a task-based search query provides multiple URLs of various movie booking sites and also set of related keywords, both of them are recognized as different types of information parameters.

In step 150, the information parameters obtained in step 148 are compared against a repository containing multiple sets of information parameters. In an embodiment, the repository may be the one which was used to store the association between task-based web interactions and various sets of information parameters by an author in step 124. A comparison is made to identify at least one set of information parameters that correspond (or map) to the information parameters obtained in step 148. Since each set of information parameters corresponds to a task-based web interaction, the comparison enables the identification of at least one at least one task-based web interaction corresponding to the set of information parameters (of step 146.) In other words, a task-based web interaction corresponding to the task-based search query is identified. To illustrate, in the context of a movie ticket booking scenario, the information parameters (URLs, key words, quicklinks, etc) obtained for a task-based keyword search "buy movie ticket" would be searched against a repository, to identify a corresponding set of information parameters. Since each set of information parameters corresponds to a task-based web interaction, the identified set of information parameters would result in locating a task-based web interaction on buying a movie ticket.

In step 152, the at least one identified task-based web interaction is presented to a user. In an embodiment, the task-based web interaction may be presented on a display device, such as, a video display unit (VDU). The identified task-based web interactions may be presented in the form of a ranking.

The presentation of an identified task-based web interaction also may be personalized with user parameters, such as, but not limited to, a user's geographical location, a user's past web interaction, etc. In an embodiment, a user's parameters may be used to automatically pre-fill fields in an online form. Pre-filling any fields in online forms which may be part of a task based interaction reduces a user's input. To illustrate with the help of online movie booking example, a search for "buy movie ticket" may pre-fill the location of a user at a movie booking site (say, www.pvrcinemas.com) thus reducing the input that a user may need to provide. In another scenario where a user may specify a particular movie name (say, "Sholay"), a search for "buy Sholay tickets" may additionally pre-fill the movie name in the task based interaction.

Steps 142 to 148 may be performed vide a graphical user interface (GUI). The GUI may be a standalone computer application, a wrapper over web search APIs (application programming interface) or as a browser plug-in.

The method steps described above may not necessarily be performed in the sequence as outlined above. The steps may be performed in any other sequence as well, with a step(s) being performed prior or later to other method steps.

Figure 2:
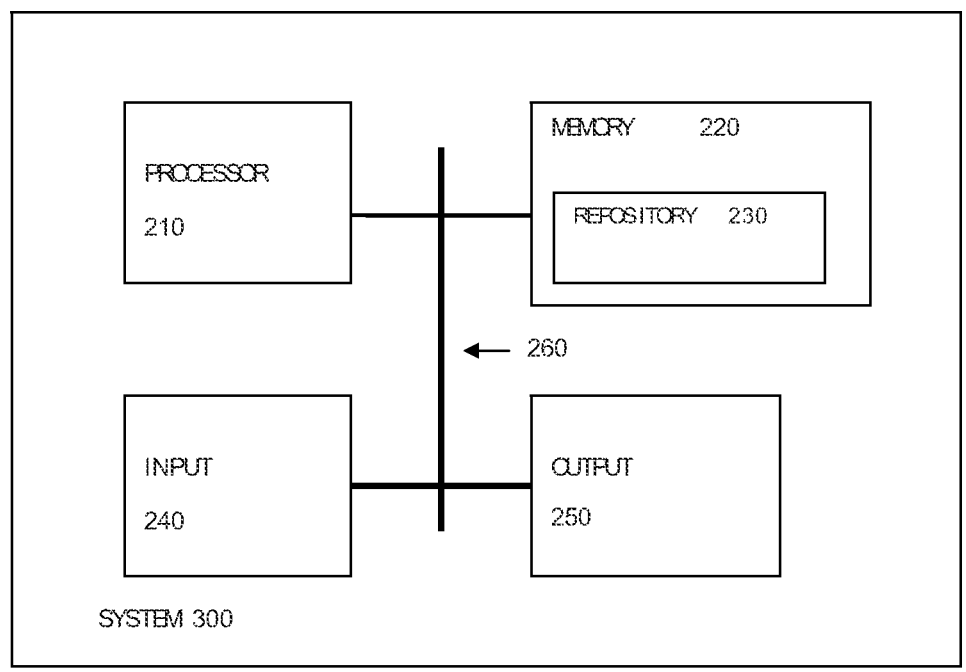
FIG. 2 shows a block diagram of a system according to an embodiment.

FIG. 2 shows a block diagram of a system according to an embodiment.

The system 200 may be any kind of computing device, such as, but not limited to, a personal computer, a desktop computer, a server computer, a laptop computer, a notebook computer, a network computer, a personal digital assistant (PDA), a mobile device, a hand-held device, or any other suitable computing device. Further, the system 200 may be a standalone system or a network system connected to other computing devices through wired or wireless means.

The system 200 may include a processor 210, for executing software instructions, a memory 220, an input device 240 and an output device 250. These components may be coupled together through a system bus 260.

The processor 210 is arranged to obtain search results from a search engine; classify search results into a set of information parameters, wherein the set of information parameters relates to the task-based web interaction provided in the search query; compare the information parameters against a repository containing multiple sets of information parameters, wherein each set of information parameters corresponds to a task-based web interaction, and to identify at least one task-based web interaction corresponding to the set of information parameters related to the task-based web interaction provided in the search query.

The memory 220 may include computer system memory such as, but not limited to, SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc. The memory 220 may be used for storing a repository 230. The repository may be a user's personal repository, a social network repository or a web based repository.

The input device 240 may include a mouse, a key pad, a touch pad or screen, a voice recognizer, and the like. The input device 240 may be used to provide a task-based web interaction search query to a search engine. The output device 250 may include a Virtual Display Unit (VDU), a printer, a scanner, and the like. The output device 250 may be used to identify at least one task-based web interaction It would be appreciated that the system components depicted in FIG. 2 are for the purpose of illustration only and the actual components may vary depending on the computing system and architecture deployed for implementation of the present solution. The various components described above may be hosted on a single computing system or multiple computer systems, including servers, connected together through suitable means.

The embodiments described provide an efficient mechanism to integrate task-based interaction with web search thus making their discovery easy and contextually relevant. Automated association of keywords from the web for tasklets (tas-based web interaction reduce workload of a tasklet author and prevents authors from using 'irrelevant but popular' tags to make their tasklets popular. The embodiments also help in reducing the number of steps required from a user to complete a task on the web. Also, the task-based interactions are personalized before being presented as search results—thus simplifying interaction.

It will be appreciated that the embodiments within the scope of the present solution may be implemented in the form of a computer program product including computer-executable instructions, such as program code, which may be run on any suitable computing environment in conjunction with a suitable operating system, such as, Microsoft Windows, Linux or UNIX operating system. Embodiments within the scope of the present solution may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present solution is for the purpose of illustration only. Although the solution has been described in conjunction with a specific embodiment thereof, those skilled in the art will appreciate that numerous modifications are possible without materially departing from the teachings and advantages of the subject matter described herein. Other substitutions, modifications and changes may be made without departing from the spirit of the present solution.

The invention claimed is:

1. A computer-implemented method of searching a task-based web interaction, comprising:

providing a task-based web interaction search query to a search engine;

obtaining search results from the search engine;

classifying search results into a set of information parameters, wherein the set of information parameters relates to the task-based web interaction provided in the search query, and the set of information parameters includes a keyword information parameter and a uniform resource location information parameter;

comparing the information parameters against a repository containing multiple sets of information parameters, wherein each set of information parameters corresponds to a task-based web interaction, to identify at least one task-based web interaction corresponding to the set of information parameters related to the task-based web interaction provided in the search query; and presenting the at least one identified task-based web interaction.

2. A method according to claim 1, further comprising building the repository containing the multiple sets of information parameters, wherein the building of the repository comprises:

extracting at least one uniform resource locator from a task-based web interaction;

providing the at least one uniform resource locator as a search query to a search engine;

obtaining search results from the search engine;

classifying search results into a set of information parameters;

associating the set of information parameters with the task-based web interaction; and storing the association between the set of information parameters and the task-based web interaction in the repository.

3. A method according to claim 1, wherein the task-based web interaction represents a user's interaction with the web for performing a task.

4. A method according to claim 3, wherein the user's interaction with the web for performing a task includes at least one user action over the web.

5. A method according to claim 1, wherein presenting at least one identified task-based web interaction includes personalizing the presentation with user parameters.

6. A method according to claim 5, wherein the user parameters includes one of the following: a user's geographical location or a user's past web interaction.

7. A method according to claim 1, wherein the repository includes at least one of the following: a user's personal repository, a social network's repository or a web based repository.

8. A method of claim 1, wherein the at least one identified task-based web interaction is presented in the form of a ranking.

9. A method of claim 8, wherein the ranking is based on type of repository whereby sets of information parameters present in a user's personal repository is given more weight over sets of information parameters present in a web based repository.

10. A non-transitory computer readable medium including machine readable instructions executed by at least one computer processor to:

provide a task-based web interaction search query to a search engine;

obtaining search results from the search engine;

classify search results into a set of information parameters, wherein the set of information parameters relates to the task-based web interaction provided in the search query, and the set of information parameters includes a keyword information parameter and a uniform resource location information parameter;

compare the information parameters against a repository containing multiple sets of information parameters, wherein each set of information parameters corresponds to a task-based web interaction, to identify at least one task-based web interaction corresponding to the set of information parameters related to the task-based web interaction provided in the search query; and present the at least one identified task-based web interaction.

11. The non-transitory computer readable medium of claim 10 wherein the machine readable instructions comprise instructions to:

build the repository containing the multiple sets of information parameters, wherein the instructions to build the repository comprise instructions to:

extract at least one uniform resource locator from a task-based web interaction;

provide the at least one uniform resource locator as a search query to a search engine;

obtain search results from the search engine;

classify search results into a set of information parameters;

associate the set of information parameters with the task-based web interaction; and store the association between the set of information parameters and the task-based web interaction in the repository.

12. A system for searching a task-based web interaction, comprising:

a memory for storing a repository;

an input system for providing a task-based web interaction search query to a search engine;

a processor for obtaining search results from the search engine; classifying search results into a set of information parameters, wherein the set of information parameters relates to the task-based web interaction provided in the search query, and the set of information parameters includes a keyword information parameter and a uniform resource location information parameter; comparing the information parameters against a repository containing multiple sets of information parameters, wherein each set of information parameters corresponds to a task-based web interaction, to identify at least one task-based web interaction corresponding to the set of information parameters related to the task-based web interaction provided in the search query; and a display for presenting the at least one identified task-based web interaction.

13. A system according to claim 12, wherein the repository includes at least one of the following: a user's personal repository, a social network's repository or a web based repository.

* * * * *

UNITED STATES PATENT AND TRADEMARK OFFICE
CERTIFICATE OF CORRECTION

PATENT NO.       : 9,639,627 B2
APPLICATION NO.  : 12/878042
DATED            : May 2, 2017
INVENTOR(S)      : Praphul Chandra et al.

Page 1 of 1

It is certified that error appears in the above-identified patent and that said Letters Patent is hereby corrected as shown below:

In the Claims

In Column 7, Line 51, in Claim 10, delete "obtaining" and insert -- obtain --, therefor.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*